(12) United States Patent
Colombano

(10) Patent No.: US 12,212,691 B2
(45) Date of Patent: Jan. 28, 2025

(54) METHOD OF OPERATING A COMPUTER-CONTROLLED DEVICE FOR ESTABLISHING A SECURE DATA COMMUNICATION IN A DISTRIBUTED CONTROL SYSTEM OF A PASSENGER TRANSPORTATION ARRANGEMENT

(71) Applicant: Inventio AG, Hergiswil (CH)

(72) Inventor: Claudio Colombano, Beckenried (CH)

(73) Assignee: INVENTIO AG, Hergiswil (CH)

( * ) Notice: Subject to any disclaimer, the term of this patent is extended or adjusted under 35 U.S.C. 154(b) by 264 days.

(21) Appl. No.: 17/760,200

(22) PCT Filed: Feb. 8, 2021

(86) PCT No.: PCT/EP2021/052900
§ 371 (c)(1),
(2) Date: Aug. 5, 2022

(87) PCT Pub. No.: WO2021/160542
PCT Pub. Date: Aug. 19, 2021

(65) Prior Publication Data
US 2023/0062888 A1    Mar. 2, 2023

(30) Foreign Application Priority Data
Feb. 13, 2020 (EP) .................................. 20157156

(51) Int. Cl.
*H04L 9/32* (2006.01)
*B66B 1/34* (2006.01)
*H04L 9/00* (2022.01)

(52) U.S. Cl.
CPC .......... *H04L 9/3263* (2013.01); *B66B 1/3415* (2013.01); *H04L 9/006* (2013.01)

(58) Field of Classification Search
None
See application file for complete search history.

(56) References Cited

U.S. PATENT DOCUMENTS

2004/0243805 A1* 12/2004 Enokida ............... H04L 9/0891
713/175
2005/0076198 A1*  4/2005 Skomra ............... H04L 63/0823
713/156

(Continued)

FOREIGN PATENT DOCUMENTS

CN      105035889 A    11/2015
CN      109299597 A     2/2019

(Continued)

*Primary Examiner* — Christopher C Harris
(74) *Attorney, Agent, or Firm* — William J. Clemens; Shumaker, Loop & Kendrick, LLP

(57) ABSTRACT

A method of operating a computer-controlled first device for establishing a secure data communication with a computer-controlled second device in a passenger transportation arrangement distributed control system includes: generating an encryption key including a public and private key pair; creating credentials (e.g. X.509 certificate) based on the generated encryption key; preparing a certificate signing request CSR and dispatching the CSR via a secured data communication path to a certificate authority CA that is based on a public key infrastructure PKI operated by the passenger transportation arrangement operator; receiving the certificate from the CA with a signature using a private key held secret by the operator; establishing the secure data communication with the second device by transmitting the credentials to the second device, wherein the second device accepts establishing the secure data communication upon verification of the signature of the credentials executed using a public key of the operator.

13 Claims, 1 Drawing Sheet

(56) References Cited

U.S. PATENT DOCUMENTS

| | | | |
|---|---|---|---|
| 2005/0204139 A1 | 9/2005 | Hellanad et al. | |
| 2009/0037728 A1* | 2/2009 | Kamikura | H04L 9/3263 |
| | | | 380/282 |
| 2010/0257358 A1* | 10/2010 | Grajek | H04L 63/06 |
| | | | 713/168 |
| 2012/0060027 A1* | 3/2012 | Vilhuber | H04L 63/0823 |
| | | | 713/156 |
| 2012/0137129 A1* | 5/2012 | Busser | H04L 9/3271 |
| | | | 713/156 |
| 2018/0307655 A1 | 10/2018 | Muncy et al. | |
| 2019/0210837 A1* | 7/2019 | Herkel | B66B 1/3461 |
| 2019/0268168 A1* | 8/2019 | Knuth | G06F 21/64 |
| 2022/0158852 A1* | 5/2022 | Brockhaus | H04L 9/006 |

FOREIGN PATENT DOCUMENTS

| | | |
|---|---|---|
| CN | 109756360 A | 5/2019 |
| CN | 110023223 A | 7/2019 |
| CN | 110182661 A | 8/2019 |
| EP | 3480751 A1 | 5/2019 |
| EP | 2368229 B1 | 9/2019 |
| WO | 2012015399 A1 | 2/2012 |
| WO | 2013065037 A1 | 5/2013 |

\* cited by examiner

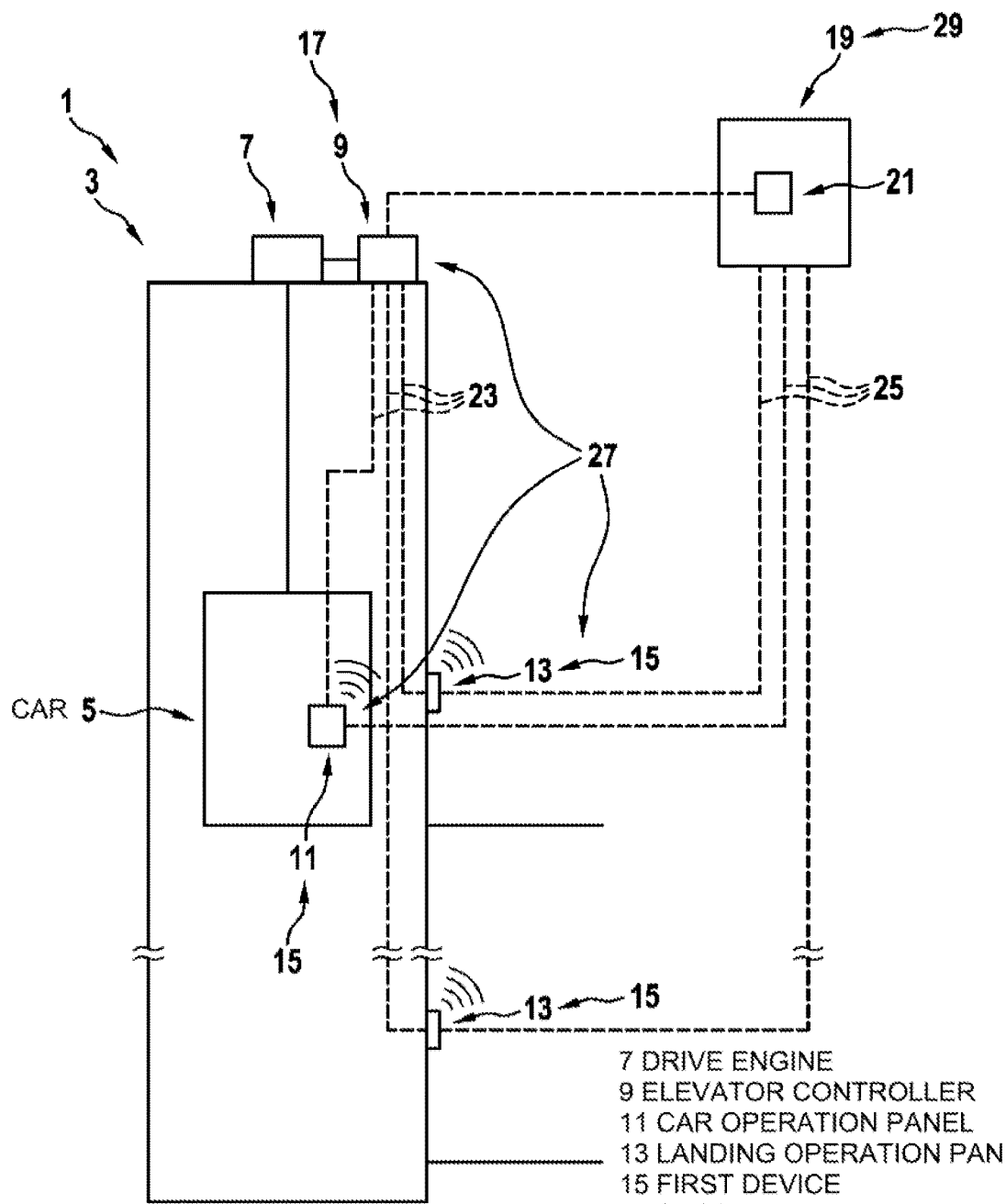

METHOD OF OPERATING A COMPUTER-CONTROLLED DEVICE FOR ESTABLISHING A SECURE DATA COMMUNICATION IN A DISTRIBUTED CONTROL SYSTEM OF A PASSENGER TRANSPORTATION ARRANGEMENT

FIELD

The present invention relates to a method of operating a computer-controlled first device for establishing a secure data communication between the computer-controlled first device and a computer-controlled second device in a distributed control system of a passenger transportation arrangement.

BACKGROUND

Passenger transportation arrangements such as elevator arrangements, escalator arrangements, moving walkway arrangements or similar arrangements are generally provided in a building for transporting passengers vertically and/or horizontally throughout the building. Typically, a passenger transportation arrangement comprises a multitude of separate devices which cooperate with each other in order to establish functionalities for the passenger transportation arrangement. For example, an elevator arrangement may comprise a controller for controlling an operation of the elevator arrangement by controlling multiple devices such as a drive engine for displacing an elevator car, a car operation panel and/or multiple landing operation panels for managing elevator calls entered by passengers, security devices for establishing reliable safety functionalities, etc. Furthermore, the elevator arrangement may be temporarily or continuously be supplemented by further devices such as for example by a maintenance device being temporarily coupled to the controller for maintenance purposes. All these separate devices may be part of a distributed control system of the passenger transportation arrangement. In modern passenger transportation arrangements, such devices are typically computer-controlled, i.e. their operation is controlled by a computer and may be configured by executing a suitable computer program.

For establishing a smooth and reliable cooperation, the multiple devices of the passenger transportation arrangement may have to communicate with each other. Therein, in order to, for example, prevent manipulations of the operation of the passenger transportation arrangement, a data communication between devices being part of the distributed control system should be as secure as possible. This means, inter alia, that it should be guaranteed that only devices which are specifically authorized are allowed to communicate with each other and exchange data.

Conventionally, secure data communication between computer-controlled devices in a distributed control system may be established for example by specifically "pairing" such devices. Typically, a pairing procedure may include establishing clearance and/or authentication between the devices forming nodes, the nodes constituting the distributed control system. For example, in the pairing procedure, both computer-controlled devices may exchange data which prove that each of the devices is authorized to communicate with the other device. The authorization may be guaranteed by requesting passwords, codes, PINs or similar secret information. Such pairing may be implemented for example during an installation procedure and/or a maintenance procedure. For passenger transportation arrangements, the pairing procedure is generally executed or managed by a technician.

However, it has been found that such conventional use of pairing procedures for establishing a secure data communication between devices in a distributed control system of a passenger transportation arrangement may suffer from disadvantages such as requiring manual interventions, reliance on physical security of the participating devices and/or the pairing procedure being prone to human errors.

Accordingly, there may be a need for an improved approach for establishing a secure data communication between various devices in a distributed control system of a passenger transportation arrangement. Furthermore, there may be a need for a passenger transportation arrangement being configured for establishing such approach.

SUMMARY

Such needs may be met with the subject-matter of the advantageous embodiments that are defined in the following specification.

According to a first aspect of the present invention, a method of operating a computer-controlled first device for establishing a secure data communication between the computer-controlled first device and a computer-controlled second device in a distributed control system of a passenger transportation arrangement is proposed. The method comprises at least the following steps, preferably in the indicated order:

(i) generating an encryption key;
(ii) creating credentials in form of a certificate based on the generated encryption key;
(iii) preparing a certificate signing request and dispatching the certificate signing request to a certificate authority via a secured data communication path, wherein the certificate authority is based on a public key infrastructure operated by an operator of the passenger transportation arrangement;
(iv) receiving the certificate back from the certificate authority, wherein the received certificate is signed by the certificate authority with a signature using a private key being a secret held by the operator of the passenger transportation arrangement;
(v) establishing the secure data communication with the computer-controlled second device by transmitting the credentials to the second device, wherein the computer-controlled second device accepts establishing the secure data communication upon verification of the signature of the credentials and wherein the verification of the signature of the credentials is executed using a public key of the operator of the passenger transportation arrangement.

According to a second aspect of the invention, a passenger transportation arrangement is proposed. The passenger transportation arrangement comprises a distributed control system with a computer-controlled first device and a computer-controlled second device. Therein, the passenger transportation arrangement is configured for executing or controlling the method according an embodiment of the first aspect of the invention.

Ideas underlying embodiments of the present invention may be interpreted as being based, inter alia, on the following observations and recognitions.

As already briefly indicated above, it is a common way to establish clearance and authentication between devices, the devices forming nodes constituting a network in a distributed control system, by pairing the devices for example at installation time. Therein, generally, once clearance is established, it needs to be repeated in case of replacement of at least one of the nodes in the network.

Such conventional approach for establishing a secure data communication between computer-controlled devices in a distributed control system of a passenger transportation arrangement by manually pairing the devices may suffer from various drawbacks. For example, it may require manual intervention by a technician such that the technician may have to personally visit the passenger transportation arrangement. Furthermore, it relies on physical security where a pairing user interface is located. Potentially, an access might be easy to break into, thereby allowing the pairing of unauthorized nodes. Additionally, such approach generally relies on a human operator performing the procedure of pairing the right devices. A rogue client operating during the pairing process might get permanent access to the network if erroneously paired by the technician. Finally, the pairing of some critical nodes might be forgotten. This could lead to systems that seem to be fully configured but in which some connections will not be granted when needed.

As an alternative to the conventional manual pairing of computer-controlled devices, a method is proposed herein which allows establishing a secure data communication between computer-controlled devices in a distributed control system of a passenger transportation arrangement in an automatic or semi-automatic manner. Therein, a clearance and authentication may be performed automatically, i.e. does generally not require any human intervention. Instead, the clearance and authentication may be securely based on certain technical provisions which are generally established in modern passenger transportation arrangements.

In the following, possible features and details of embodiments of the method and passenger transportation arrangement proposed herein will generally be described with reference to an example in which the passenger transportation arrangement is an elevator and in which the computer-controlled second device is an elevator controller. However, it shall be noted that the passenger transportation arrangement may alternatively be embodied for example as an escalator, a moving walkway or similar devices which are generally included in buildings for transporting passengers throughout the building. Accordingly, the computer-controlled second device may be any controller controlling for example an operation of or in such passenger transportation arrangement.

In an elevator, there is generally a multitude of computer-controlled devices forming nodes in a distributed control system, such devices being referred to herein as first devices. For example, a car operation panel (COP) and/or landing operation panels (LOP) may be used for forming a human-machine-interface via which passengers may for example enter calls for displacing an elevator car to an intended floor. In modern elevators, such COP and/or LOP may be computer-controlled, i.e. may comprise a processor which may process, analyze and/or modify signals received from e.g. switches, push buttons or other sensors comprised in the COP or LOP. The COP and/or LOPs may communicate with the elevator controller forming the computer-controlled second device such that the elevator controller may for example control a car displacement in accordance with the calls of passengers. Furthermore, other computer-controlled first devices may be configured for guaranteeing safe operation of the elevator. For example, an overspeed of the elevator car may be detected by a suitable sensor device and may be reported to the elevator controller such that suitable countermeasures may be taken for limiting the overspeed. Furthermore, the distributed control system in the elevator may comprise a variety of other sub-controllers.

The mentioned first devices may be permanently connected to the distributed control system, i.e. a first device may be one of multiple on-site devices which are connected to the distributed control system upon installation of the elevator and which may generally only be disconnected from the distributed control system in case of a replacement being necessary for example due to a malfunction of the respective first device.

Alternatively, computer-controlled first devices may be devices which are only temporarily connected to the distributed control system of an elevator. In other words, the computer-controlled first device may be a device with is configured for being retrofitted into the passenger transportation arrangement and to then communicate with the computer-controlled second device. For example, for maintenance purposes, mobile devices may have to be temporarily connected to other devices in the distributed control system of the elevator. Accordingly, specific first devices may have to be temporarily included into the distributed control system of the elevator for example during a maintenance procedure and may be excluded from such distributed control system again after completion of the maintenance procedure.

The data communication between the computer-controlled devices in the distributed control system may be established using wired lines connecting for example ports or interfaces of the various devices with each other. Alternatively, data communication may be established using wireless data communication such as Wi-Fi, Bluetooth or similar technologies.

The computer-controlled first device may establish the secure data communication to the computer-controlled second device by executing specific method steps, thereby following a specific protocol as follows:

Initially, the first device generates its own encryption key. Such encryption key generation may be executed autonomously, i.e. without any required interaction with other devices or humans. Preferably, the encryption key may comprise a key pair including a public key and a private key. Therein, as is generally known in an encrypted data communication, the public key may be made publicly available and may be used for encrypting data whereas the private key may be used for decrypting such encrypted data and has to be kept secret to the owner of the encryption key. The encryption key may be generated for example upon a first boot or a reboot of the first device. Generally, a sufficient amount of entropy should be available in order to guarantee that any two first devices will have different random encryption keys with extremely high probability.

Then, the first device may create its own credentials. Such credentials may be created in form of a certificate. Specifically, the certificate forming the credentials may be created based on the previously generated encryption key. According to an embodiment, the credentials may be created in form of an X.509 certificate by using the key pair generated in the preceding method step. In cryptography, X.509 is a standard defining the format of public key certificates.

Subsequently, the first device prepares a so-called certificate signing request (CSR). Generally, in public key infrastructure (PKI) systems, a certificate signing request (also referred to as certification request) may be a message sent from an applicant to a certificate authority (CA) in order to apply for a digital identity certificate. It usually contains the public key for which the certificate should be issued, identifying information (such as a domain name) and integrity protection (e.g., a digital signature). The certificate signing request is then dispatched to a specific certificate authority via a secured data communication path.

Therein, the certificate authority shall be based on a public key infrastructure (PKI) which is operated by an operator of the passenger transportation arrangement. In other words, the certificate authority to which the certificate signing request is sent by the first device shall be implemented in a public key infrastructure, wherein this public key infrastructure shall be managed by the operator of the passenger transportation arrangement. Accordingly, only the operator of the passenger transportation arrangement has administrative access to the public key infrastructure. Thus, this public key infrastructure may be trusted by the first device, i.e. the first device may assume that any data or information received from such public key infrastructure is valid and authentic. The operator of the passenger transportation arrangement may be for example a manufacturer of the passenger transportation arrangement or a service provider providing monitoring and/or maintenance services for the passenger transportation arrangement. Particularly, the operator of the passenger transportation arrangement is assumed to form a trusted authority such that the certificate authority implemented in the public key infrastructure managed by such operator may also be assumed to form a trusted authority.

Furthermore, upon dispatching the certificate signing request, such certificate signing request shall be sent to the certificate authority via a secured data communication path. Such secured data communication path shall be permanently or temporarily established between the computer-controlled first device and the certificate authority in such a manner that any data communication via such path is secure, i.e. may neither be many manipulated nor listened to or intercepted in an unauthorized manner. In other words, the secured data communication path may at least temporarily connect the computer-controlled first device with the certificate authority. Generally, in modern passenger transportation systems, such secured data communication path is permanently provided or may be temporarily established with a server managed by the operator of the passenger transportation arrangement such that the operator may for example securely monitor an actual operation of the passenger transportation system via the secured data communication path and/or provide for example instructions to the passenger transportation system via the secured data communication path for example for maintenance purposes.

According to an embodiment, the secured data communication path may be established via the internet. In other words, at least one of the computer-controlled first and second devices may at least temporarily comprise internet access and may be configured for establishing the secured data communication path for establishing secure data communication with the certificate authority. In modern passenger transportation arrangements, such Internet access of computer-controlled devices is already provided in many cases.

Particularly, the secured data communication path may be established via a virtual private network configured on an internet gateway. A virtual private network (VP N) may generally connect a device or extend a private network across a public network, and enables users to send and receive data across shared or public networks as if their computing devices were directly connected to the private network. Applications running on a computing device across a VPN may therefore benefit from a functionality, security, and management of the private network. Encryption is a common, though not an inherent, part of a VPN connection. To guarantee security, the private network connection is generally established using an encrypted layered tunneling protocol, and VPN users may use authentication methods, including passwords or certificates, to gain access to the VPN. A VPN is typically created by establishing a virtual point-to-point connection through the use of dedicated circuits or with tunneling protocols over existing networks. A VPN available from the public Internet can provide some of the benefits of a wide area network (WAN).

Upon receiving the certificate signing request dispatched by the first device, the certificate authority signs the certificate with its private key. Therein, the private key used for the signature is a secret held by the certificate authority, i.e. indirectly a secret held by the operator of the passenger transportation arrangement. In other words, the signature used for signing the certificate submitted by the first device may be generated exclusively by the public key infrastructure managed by the operator of the passenger transportation arrangement, wherein such public key infrastructure is configured for implementing the certificate authority. Accordingly, the certificate being signed with such signature may be used for "proving" a clearance and authorization for the computer-controlled first device, as the fact that the first device receives the certificate back from the certificate authority and the certificate is signed by the certificate authority may guarantee that the first device has an access to the trusted certificate authority via the secured data communication path. Accordingly, the signed certificate may later be used as authentication credentials upon establishing a secure data communication with other devices, particularly with the computer-controlled second device.

For example, after receiving the certificate back from the certificate authority, the signed certificate may be stored in a secured memory of the computer-controlled first device. In other words, the certificates signed and received back from the certificate authority may be stored by the first device for example in a protected area of a file system. Such secured memory may be accessible only by the first device, i.e. it may be configured such that any spying or manipulating of data stored in such memory may be reliably prevented.

Finally, for example at a point in time when data communication with the computer-controlled second device is required, the secure data communication with this second device may be established by transmitting the credentials to the second device. Therein, the second device generally accepts establishing the secure data communication upon verifying the signature included in the credentials. In other words, when receiving a request from another computer-controlled device to establish data communication, the addressed device may first check whether the other device is authenticated and authorized for such data communication by checking whether the credentials sent by the other device are signed by the certificate authority. Only in case of such validly signed certificate, the second device accepts exchanging data with the first device.

In order to be able to check the validity of the signature of credentials, each device comprised in the distributed control system, i.e. the computer-controlled first and second devices, may comprise a copy of the public key of the operator of the passenger transportation arrangement stored internally in the respective computer-controlled device. For example, the public key may be burned into a firmware of the computer-controlled device, e.g. at a software creation time. As this public key of the operator relates to the private key with which the certificate authority has previously signed the certificate forming the credentials of the first device, the second device may therefore check the signature in these credentials. Accordingly, upon having successfully verified the signature of the credentials, authentication and authorization of the first device is guaranteed and secure data communication between the first and second devices may be established.

Summarized, establishing a secure data communication between computer-controlled devices of a distributed control system of a passenger transportation arrangement in accordance with the method proposed herein and the passenger transportation arrangement configured for implementing such method may be understood as being based on the following preconditions:

First, an operator of the passenger transportation arrangement possesses a public key infrastructure on which a trusted certificate authority is based.

Second, there is a reliable and secure way to communicate between the computer-controlled first device, located for example in a machine room of the passenger transportation arrangement, and the operator's certificate authority, located for example remote from the passenger transportation arrangement. For example, such communication may be established via an Internet gateway.

Third, each of the computer-controlled devices in the distributed control system shall have a copy of the public key of the certificate authority in order to be able to check an authentication and authorization of a communication partner device by checking the signature in its credentials.

Particularly the above mentioned second feature may guarantee that each certificate signed by the certificate authority will be accepted by each other device in the distributed control system receiving external attempts of connection with the credentials.

Embodiments of the method proposed herein may have for example advantages of requiring no specific configuration of devices in the field. Mutual trust may be created automatically by using certificates signed by the certificate authority, which may be created automatically.

However, one possible liability may be an impact that a leaked private key and corresponding certificate may have globally. Generally, anyone possessing this information, which may be achieved for instance by reverse engineering a particular computer-controlled device, would be in a position to create an authorized other device that would be able to establish data communication with all other devices in the distributed control system.

In order to overcome such drawback, a validity of the signed certificate may be limited to a predetermined maximum duration. Furthermore, after expiry of the validity, the method steps (iii) to (v) may have to be repeated. In other words, a life duration of the certificate may be kept short enough so that an impact of a possible leak will be time limited. Accordingly, the method steps (iii), (iv) and (v), i.e. preparing and dispatching the certificate signing request, receiving the certificate signed by the certificate authority and finally establishing the secure data communication upon verifying authentication and authorization by checking the signature of the credentials, shall be repeated at sufficiently short time intervals. For example, such time intervals may be in a range from a few days to several months. For example, the time intervals may be equal to or shorter than nine months.

Summarized, with the approach proposed herein, a secure data communication between computer-controlled devices in a distributed control system of a passenger transportation arrangement may be reliably established without the need of pairing the devices and therefore with no local manipulations required. Accordingly, manual work may be saved and/or risks of human mistakes may be reduced.

It shall be noted that possible features and advantages of embodiments of the invention are described herein partly with respect to a method for establishing a secure data communication in a distributed control system of a passenger transportation arrangement and partly with respect to a passenger transportation arrangement being configured for implementing such method. One skilled in the art will recognize that the features may be suitably transferred from one embodiment to another and features may be modified, adapted, combined and/or replaced, etc. in order to come to further embodiments of the invention.

In the following, advantageous embodiments of the invention will be described with reference to the enclosed drawing. However, neither the drawing nor the description shall be interpreted as limiting the invention.

DESCRIPTION OF THE DRAWINGS

FIG. 1 shows a passenger transportation arrangement in which a secure data communication between computer-controlled first and second devices may be established in accordance with an embodiment of the present invention.

The FIGURE is only schematic and not to scale. Same reference signs refer to same or similar features.

DETAILED DESCRIPTION

FIG. 1 shows a passenger transportation arrangement 1 embodied as an elevator 3. The elevator 3 comprises an elevator car 5 which may be displaced throughout an elevator shaft using a drive engine 7. The drive engine's operation may be controlled by an elevator controller 9. Furthermore, passengers may actuate a car operation panel 11 and/or landing operation panels 13 for entering calls requesting the elevator car 5 to be displaced to a destination level.

The elevator controller 9, the car operation panel 11, the landing operation panels 13 and possibly other components may be implemented using computer-controlled devices which may form nodes in a distributed control system 27 of the elevator 3. Particularly, the elevator controller 9 may for example form a computer-controlled second device 17 with which other first devices 15 such as the car operation panel 11 or the landing operation panels 13 may have to communicate in a secure manner.

In order to establish such a secure data communication 23 (as indicated in the FIGURE by dotted lines) between the computer-controlled first devices 15 and the computer-controlled second device 17, a respective first device 15 initially generates its own encryption key including for example a key pair with a private encryption key and a public encryption key. Using such key pair, the first device 15 may then create own credentials in form of e.g. an X.509 certificate.

The approach proposed herein then benefits from the fact that, in modern elevators, the computer-controlled first and second devices 15, 17 generally have at least temporarily access to a network such as the Internet via which they may create a secured data communication path 25 (as indicated in the FIGURE by dotted lines) for example with an external server 29. The secured data communication path 25 may for example use a virtual private network connecting the first and second devices 15, 17 with the external server 29. The external server 29 may be operated for example by an operator of the passenger transportation arrangement 1 such as a manufacturer of the elevator 3. The server 29 may establish a public key infrastructure (PKI) 19 on which a certification authority (CA) 21 may be based.

The computer-controlled first device 15 may then prepare a certificate signing request (CSR) and transmit this certificate signing request via the secured data communication path 25 towards the certification authority 21. As the certification authority 21 assumes that every device which is capable of communicating via such secured data communication path 25 may be trusted, the certification authority 21 then signs the certificate transmitted together with the certificate signing request and sends it back to the computer-controlled first device 15.

Upon having received the signed certificate back from the certificate authority 21, the computer-controlled first device 15 may store the final credentials for example in a secured memory and may simultaneously or later transmit the credentials including the signed certificate to the computer-controlled second device 17. The second device 17 may then verify the signature included in such credentials by using a public key of the operator of the passenger transport system stored for example in the firmware of the second device. As a result of a successful verification of the signature, the secure data communication 23 between the first and second devices 15, 17 may be established in a fully automated manner.

Finally, it should be noted that the term "comprising" does not exclude other elements or steps and the "a" or "an" does not exclude a plurality. Also elements described in association with different embodiments may be combined.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS 1 passenger transportation arrangement
3 elevator
5 elevator car
7 drive engine
9 elevator controller
11 car operation panel
13 landing operation panels
15 computer-controlled first device
17 computer-controlled second device
19 public key infrastructure
21 certification authority
23 secure data communication
25 secured data communication path
27 distributed control system
29 external server

The invention claimed is:

1. A method of operating a computer-controlled first device for establishing a secure data communication between the first device and a computer-controlled second device in a distributed control system of a passenger transportation arrangement, the method comprising the steps of:
generating an encryption key;
creating credentials in certificate form based on the generated encryption key;
preparing a certificate signing request and dispatching the certificate signing request to a certificate authority via a secured data communication path, wherein the certificate authority is based on a public key infrastructure operated by an operator of the passenger transportation arrangement;
receiving a signed certificate from the certificate authority, wherein the signed certificate is signed by the certificate authority with a signature using a private key being a secret held by the operator of the passenger transportation arrangement;
establishing the secure data communication with the second device by transmitting the credentials including the signed certificate to the second device, wherein the second device accepts establishing the secure data communication upon verification of the signature of the credentials, and wherein the verification of the signature of the credentials is executed using a public key of the operator of the passenger transportation arrangement.

2. The method according to claim 1 wherein the encryption key comprises a key pair including a public key and a private key.

3. The method according to claim 2 including creating the credentials in a form of an X.509 certificate by using the key pair.

4. The method according to claim 1 wherein the secured data communication path at least temporarily connects the first device with the certificate authority.

5. The method according to claim 4 including establishing the secured data communication path via an internet connection.

6. The method according to claim 4 including establishing the secured data communication path via a virtual private network configured on an internet gateway.

7. The method according to claim 1 wherein, after receiving the signed certificate from the certificate authority, storing the signed certificate in a secured memory of the first device.

8. The method according to claim 1 wherein the first device includes a copy of the public key of the operator of the passenger transportation arrangement stored internally in the first device.

9. The method according to claim 1 including limiting a validity of the signed certificate to a predetermined maximum duration and wherein, after expiry of the validity, repeating the preparing, receiving and establishing steps.

10. A passenger transportation arrangement comprising:
a distributed control system with a computer-controlled first device and a computer-controlled second device; and
wherein the passenger transportation arrangement establishes a secure data communication between the first device and the second device by performing steps of:
generating an encryption key;
creating credentials in certificate form based on the generated encryption key;
preparing a certificate signing request and dispatching the certificate signing request to a certificate authority via a secured data communication path, wherein the certificate authority is based on a public key infrastructure operated by an operator of the passenger transportation arrangement;
receiving a signed certificate from the certificate authority, wherein the signed certificate is signed by the certificate authority with a signature using a private key being a secret held by the operator of the passenger transportation arrangement;
establishing the secure data communication with the second device by transmitting the credentials including the signed certificate to the second device, wherein the second device accepts establishing the secure data communication upon verification of the signature of the credentials, and wherein the verification of the signature of the credentials is executed using a public key of the operator of the passenger transportation arrangement.

11. The passenger transportation arrangement according to claim 10 being an elevator and wherein the second device is an elevator controller controlling the elevator.

12. The passenger transportation arrangement according to claim 10 wherein the first device is configured to be retrofitted into the passenger transportation arrangement and to then communicate with the second device.

13. The passenger transportation arrangement according to claim 10 wherein at least one of the first device and the second device at least temporarily has internet access and is adapted to establish the secured data communication path for establishing secure data communication with the certificate authority.

* * * * *